United States Patent [19]

Mehl

[11] Patent Number: 4,967,097

[45] Date of Patent: Oct. 30, 1990

[54] HYBRID POWER SYSTEM

[76] Inventor: Bryon R. Mehl, c/o Sundstrand Corp., 4949 Harrison Ave., Rockford, Ill. 61125-7003

[21] Appl. No.: 320,490

[22] Filed: Mar. 8, 1989

[51] Int. Cl.[5] ............................ H02J 1/00; H02P 9/00

[52] U.S. Cl. ...................................... 307/84; 290/4 C; 290/4 R; 318/14; 307/16

[58] Field of Search ..................... 307/84, 16; 318/149, 318/156, 14; 290/4 R, 1 R, 4 C; 322/40, 12

[56] References Cited

U.S. PATENT DOCUMENTS

| | | | |
|---|---|---|---|
| 1,450,339 | 4/1923 | Smith et al. | 307/84 |
| 2,892,098 | 6/1959 | Bergvall | 307/84 |
| 3,056,914 | 10/1962 | Potter . | |
| 3,070,741 | 12/1962 | Ford . | |
| 4,252,035 | 2/1981 | Cordner et al. . | |
| 4,315,442 | 2/1982 | Cordner . | |
| 4,572,961 | 2/1986 | Borger | 290/4 R |
| 4,684,873 | 8/1987 | Glennon | 307/84 X |
| 4,695,776 | 9/1987 | Dishner et al. | 290/4 C X |
| 4,743,812 | 5/1988 | Dishner | 290/4 R X |

*Primary Examiner*—William M. Shoop, Jr.
*Assistant Examiner*—Sharon D. Logan

[57] ABSTRACT

A hybrid power source includes a constant speed drive having an input coupled to a prime mover which develops variable speed motive power, an output driven at a substantially constant speed and a speed compensation link which transmits motive trim power at a magnitude determined by the speed of the prime mover. A first generator is coupled to the output of the constant speed drive and develops constant frequency AC power for AC loads. A second generator is coupled to the speed compensation link and is driven by the motive trim power such that the second generator develops power for DC loads and frequency insensitive loads wherein the power developed by the second generator is at a frequency which varies in accordance with the magnitude of the trim power.

10 Claims, 11 Drawing Sheets

HYBRID POWER SYSTEM

BACKGROUND OF THE INVENTION

The present invention relates generally to electric power sources and systems, and more particularly to a power system which develops constant frequency AC power, variable frequency AC power and/or DC power.

BACKGROUND

Power generating systems have been devised wherein both AC and DC output power are developed by a single generator which is driven by a prime mover. Typically, such generating systems, particularly in aerospace applications, include a constant speed drive coupled between the prime mover and the generator so that the alternating current power developed by the generator is of fixed frequency. Alternatively, in those systems where a constant speed drive is not used, the output of the generator is coupled to some type of electronic power converter so that the variable frequency alternating current power developed by the generator is converted to fixed frequency power. Such a power converter may comprise, for example, a DC link converter, a cycloconverter or the like.

Cook et al. U.S. Pat. application Ser. No. 15,903, filed Feb. 18, 1987, and assigned to the assignee of the instant application (Sundstrand Docket No. B02341-ATI-USA) discloses a power generating system including a differential having a first shaft coupled to a prime mover output shaft, a second shaft coupled to a fixed frequency generator and a third shaft coupled to a variable frequency generator. In a first form of the system, the variable frequency generator is coupled through a DC-link power converter to the output of the fixed frequency generator. The DC-link converter is controlled to develop constant frequency power which locks the fixed frequency generator at a desired output frequency. In a second form of the invention, the loading of the variable frequency generator is controlled to insure that the other generator is driven at a constant speed so that it develops constant frequency power. In both forms of the invention, the variable frequency generator develops variable frequency AC power which may be rectified for use by DC loads while the constant frequency generator develops power for AC loads. If desired, the output of the fixed frequency generator may be rectified and applied in parallel with the rectified output of the variable frequency generator. Further, this combined DC output power may be converted back into AC power by a DC/AC power converter and coupled in parallel with the AC output of the first generator. In this fashion, both generators are capable of supplying power to AC and DC loads.

Ford U.S. Pat. No. 3,070,741 discloses an electric generating apparatus which develops constant frequency AC power from variable-speed motive power provided by an aircraft engine. The apparatus includes a differential having a first shaft coupled to the engine, a second shaft coupled to a synchronous generator and a third shaft coupled to an electromagnetic machine having first and second sets of rotor and stator windings. The sets of rotor windings are physically and electrically coupled together. The output of the first set of stator windings is combined with the output of the synchronous generator to derive an output of the apparatus while the second set of stator windings is coupled through a static frequency changer to the output. During operation, the frequency changer is controlled so that the first set of stator windings delivers power at a constant frequency to the synchronous generator. The synchronous generator receives constant excitation from a DC source and is locked at a constant speed by the constant frequency output of the first set of stator windings so that it develops constant frequency power at the same frequency as the power developed in the first set of stator windings.

Dishner et al. U.S. Pat. No. 4,695,776, assigned to the assignee of the instant application (Sundstrand Docket No. B02150A-ATI-USA) discloses an electrically compensated constant speed drive which may be used to convert variable-speed motive power produced by a prime mover into constant-speed motive power for driving a generator so that the generator develops constant frequency AC power. The drive includes a differential speed summer having a first shaft coupled to the motive power shaft of the prime mover, an output shaft coupled to the generator and a speed compensation link coupled between a second input shaft of the differential and the output shaft of the prime mover. The speed compensation link includes first and second permanent magnet machines having motive power shafts coupled to the prime mover output shaft and the second input shaft of the differential, respectively, and an electrical power converter interconnecting electrical power windings of the permanent magnet machines.

Other types of constant speed drives which utilize electromechanical machines in the speed compensation link of the drive are disclosed in Borger U.S. Pat. No. 4,572,961 and Potter U.S. Pat. No. 3,056,914.

Cordner et al. U.S. Pat. No. 4,252,035 and Cordner U.S. Pat. No. 4,315,442 disclose constant speed drives of the hydromechanical type utilizing a variable-displacement pump and a fixed-displacement motor in the speed compensation link of the drive.

In each of the foregoing constant speed drives, the electromechanical or hydromechanical machines are controlled such that compensating speed of appropriate magnitude and direction is provided at the second input shaft of the differential to keep the output shaft rotating at a constant speed. However, it has been found that the power transfer through the speed compensation link of such drives involves losses which reduce efficiency.

DISCLOSURE OF THE INVENTION

In accordance with the present invention, a hybrid power system which utilizes a constant speed drive is capable of providing constant frequency AC power, variable frequency AC power and/or DC power and is highly efficient.

More particularly, the hybrid power system comprises a constant speed drive having an input coupled to a prime mover which develops variable-speed motive power, an output driven at a substantially constant speed and a speed compensation link which transmits motive trim power at a magnitude determined by the speed of the prime mover. A first generator is coupled to the output of the constant speed drive and a second generator is coupled to the speed compensation link and driven by the motive trim power such that the first generator develops constant frequency AC power and the second generator develops power at a frequency which varies in accordance with the magnitude of the trim power.

The output of the first generator may be used to supply power to loads requiring constant frequency AC power. The output of the second generator may be supplied to frequency-insensitive loads and/or the output may be rectified to produce power for DC loads.

The speed compensation link includes a power summing node to which the second generator is connected. A power converter is connected in the speed compensation link between the power summing node and the prime mover output. Preferably, the power supply is designed such that at expected or usual operating conditions substantially all of the power delivered to the power summing node is transferred to loads so that little or no power flows through the power converter. Thus, efficiency under usual operating conditions is maintained at a high value.

At operating conditions other than the usual, the power flowing into the power summing node may be greater than or less than that required to properly supply loads. If the power is greater than that required, the excess power is transferred through the power converter to the prime mover output so that the speed of the output shaft of the differential is maintained at a constant desired speed. If the power flowing into the power summing node is less than that required, additional power is transferred from the prime mover to the power summing node via the power converter so that the total power exiting the power summing node is sufficient to properly supply the loads. Alternatively, some of the loads coupled to the second generator may be transferred to the output of the first generator so that the power which must be supplied by the second generator is reduced to a magnitude which can be supported thereby. This may be accomplished by a control which varies the magnitude of the load on the second generator in dependence upon a parameter of the second generator output or another parameter.

DESCRIPTION OF THE PREFERRED EMBODIMENT

Figure 1:
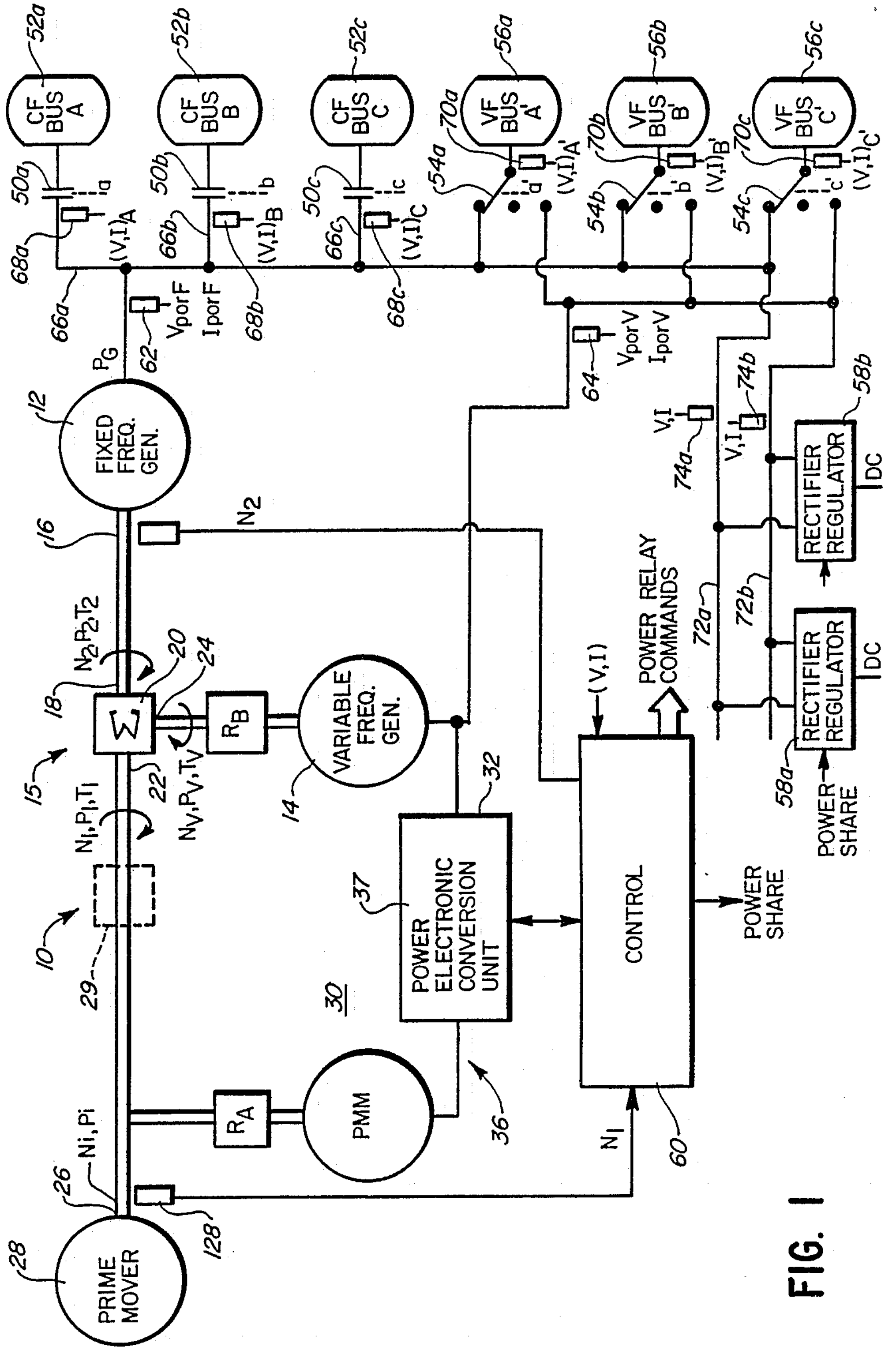
FIG. 1 is a block diagram of a first embodiment of the hybrid power system according to the present invention.

Referring now to FIG. 1, a hybrid power system 10 according to the present invention includes first and second generators 12, 14, also referred to as fixed frequency and variable frequency generators, respectively, coupled to a constant speed drive 15. The fixed frequency generator 12 includes a motive power shaft 16 which is coupled to an output shaft 18 of a differential speed summer 20. The differential 20 further includes a first shaft 22 and a second shaft 24. The shaft 22 is coupled to an output shaft 26 of a prime mover 28. The differential 20 may effect an inherent speed multiplication of the prime mover speed, as represented by a gear box 29, which for purposes of simplicity is assumed to have a 1:1 gear ratio. A speed compensation link, generally indicated at 30, is coupled between the second shaft 24 of the differential 20 and the output shaft 26 of the prime mover 28. The speed compensation link includes first and second gear boxes $R_A$ and $R_B$ and a power summing node 32 to which output windings of the variable frequency generator 14 are coupled. Connected between the power summing node 32 and the output shaft 26 of the prime mover 28 is a power converter 36 which may include, for example, a permanent magnet machine PMM and a power electronic conversion unit 37 such as those disclosed in Dishner et al. U.S. Pat. No. 4,695,776, the disclosure of which is hereby incorporated by reference.

Figure 2:
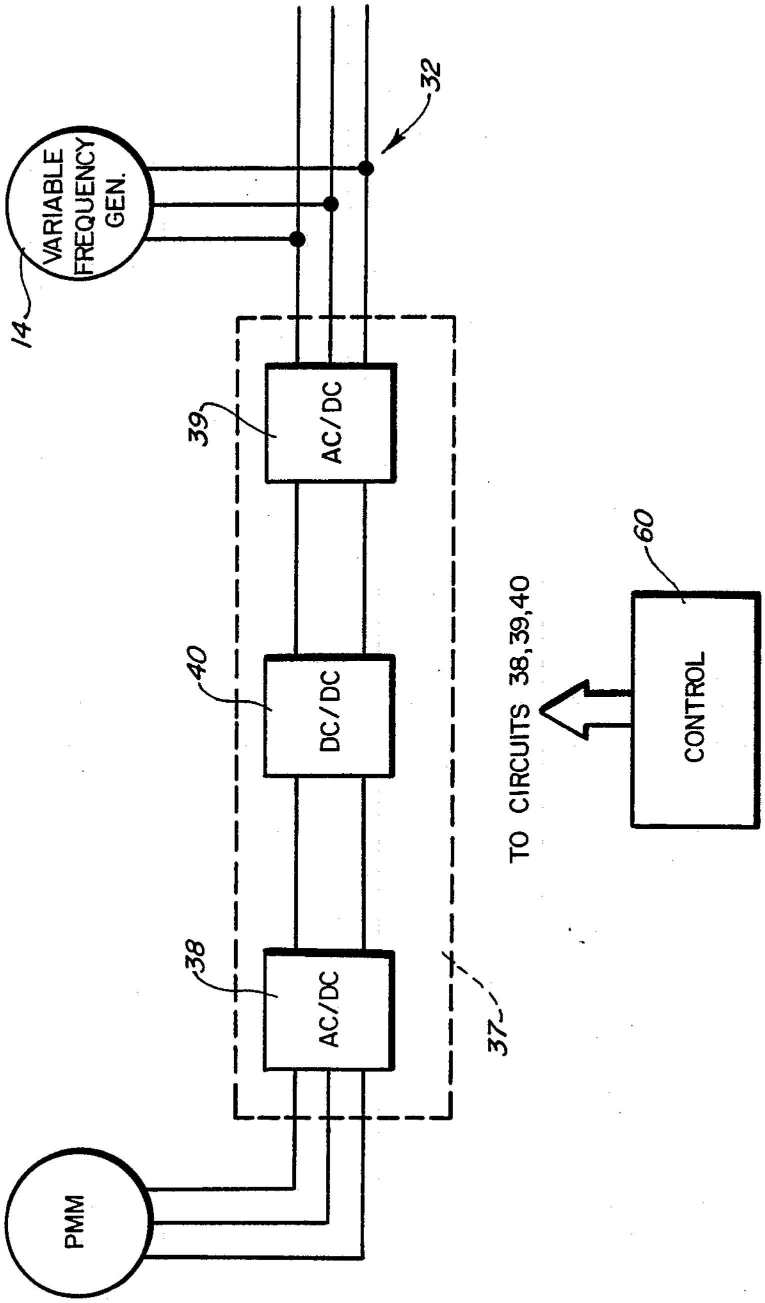
FIG. 2 is a block diagram of the power converter of FIG. 1.

Referring specifically to FIG. 2, the power electronic conversion unit 37 may include first and second AC/DC converters 38 and 39 coupled to the output windings of the permanent magnet machine (PMM) and the power summing node 32, respectively, and a DC/DC converter 40 coupled between the first and second AC/DC converters.

Figure 3:
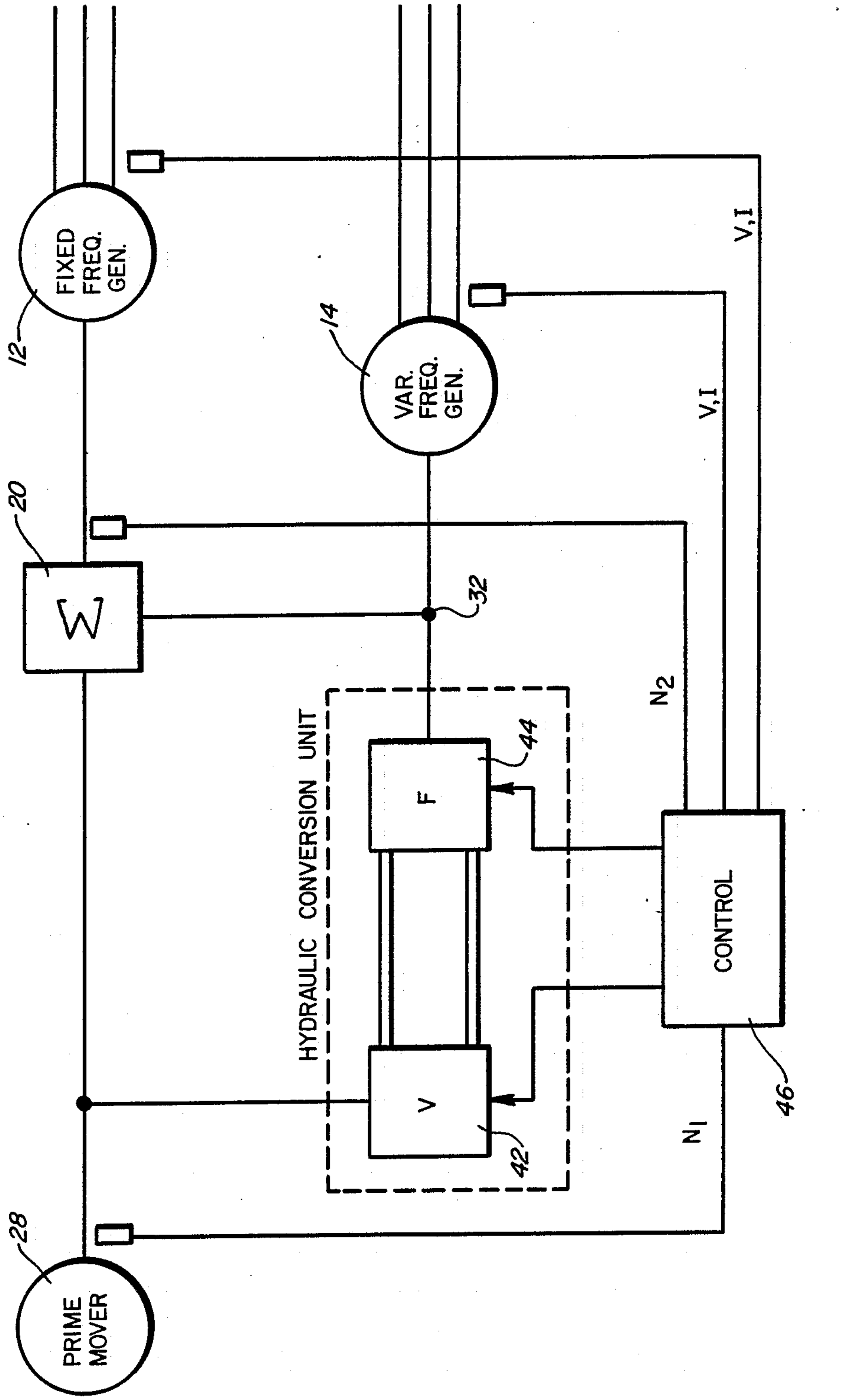
FIG. 3 is a block diagram of an second embodiment of the invention.

In an alternative embodiment of the invention, the permanent magnet machine PMM and the power electronic conversion unit 37 may be replaced by a hydraulic power conversion unit comprising a variable displacement pump 42 and a fixed displacement motor 44 which are interconnected by hydraulic lines and which are operated by a hydraulic control 46, as illustrated in FIG. 3. The motor 44 includes a motive power shaft which is coupled to the motive power shaft of the variable frequency generator 14 at the power summing node 32. It should be noted that the first and second gear boxes $R_A$ and $R_B$ are not shown in FIG. 3 for simplicity.

A comparison of FIGS. 1 and 3 reveals that the variable frequency generator and the power converter are both coupled to the power summing node in both embodiments.

Referring again to FIG. 1, the fixed frequency generator 12 includes output or armature windings which are coupled through controllable contactor sets 50*a*, 50*b* and 50*c* to a plurality of constant frequency power buses 52*a*, 52*b* and 52*c*, respectively. While three constant frequency buses 52*a*–52*c* have been shown in FIG. 1, it should be understood that a greater or lesser number of constant frequency buses may be provided, as desired.

The fixed frequency generator 12 is also coupled through controllable switches 54*a*–54*c* to variable frequency buses 56*a*–56*c*, respectively, as well as to first and second rectifier/regulator circuits 58*a*, 58*b*. Again, a different number of variable frequency buses and rectifier/regulators may be utilized, if desired.

It should be noted that while single lines are illustrated as interconnecting the armature windings of the fixed frequency generator 12 to the buses 52, 56 and rectifier/regulator circuits 58, it should be understood that the generator 12 is typically a three-phase device, and hence a correspondingly larger number of conductors would actually be required for such interconnection.

The generator 14 is selectively coupled to the variable frequency buses 56a–56c via the switches 54a–54c as are the rectifier/regulator circuits 58a and 58b.

Constant-frequency loads may be coupled to the constant frequency buses 52a–52c whereas loads which are frequency insensitive may be coupled to the variable frequency buses 56a–56c. DC loads may be provided power by the rectifier/regulator circuits 58a and 58b.

While the rectifier/regulator circuits 58a, 58b are illustrated as being connected directly to the fixed and variable frequency generators 12, 14, it should be noted that these circuits may instead be connected as any other variable frequency AC load through additional controllable switches like the switches 54a–54c.

A control 60 is provided to operate the AC/DC converters 38 and 39 and the DC/DC converter 40. The control is responsive to the speed of $N_1$ of the prime mover 28 and to the speed $N_2$ of the differential output shaft 18. The control 60 is further responsive to power parameters in the form of currents and voltages $I_{PORF}$, $V_{PORF}$, $I_{PORV}$ and $V_{PORV}$ at the outputs of the fixed frequency generator 12 and the variable frequency generator 14, respectively, as detected by sensors 62, 64. The control 60 is further responsive to the voltage and current on buses 66a, 66b and 66c coupled to the contactors 50a–50c, as detected by sensors 68a–68c, as well as the voltage and current on the variable frequency buses 56a–56c as detected by sensors 70a–70c. In addition to the foregoing, the control 60 is also responsive to the voltage and current on buses 72a and 72b as detected by sensors 74a and 74b, respectively. The control 60 controls the rectifier/regulator circuits 58a, 58b by means of a power share signal and, in addition, controls the contactors 50a–50c and the switches 54a–54c to connect frequency insensitive and constant frequency loads to the outputs of the fixed frequency generator 12 and the variable frequency generator 14.

In a general sense, the power supply of FIG. 1 may be operated to control the speed of the fixed frequency generator 12 by extracting power from the differential 20. This power may either be recirculated to the prime mover shaft via the speed compensation link 30 or may be utilized to provide power to variable frequency and/or DC loads. More specifically, inasmuch as the differential 20 is a speed summer, $$N_2 = N_1 + N_v$$

Since the torques on all shafts must have equal magnitudes then:

$$\frac{P_v}{2\pi N_v} = T_v = T_2 = \frac{P_2}{2\pi N_2}$$

For every input speed $N_1$ and a fixed output shaft 18 speed the trim shaft 24 speed must be:

$$N_2 - N_1 = N_v$$

and to achieve this condition, the trim shaft 24 must be loaded such that:

$$P_v = \frac{N_v}{N_2} P_2$$

This load may be applied by the variable speed generator 14 or by the recirculating power conversion unit 37 and the machine PMM.

For a typical system where gear mesh efficiency is 0.99, generator efficiency is 0.89, and recirculating power conversion unit efficiency is 0.75, the following efficiencies can be calculated:

$N_1 = N_2$ (i.e. at idle speed)
$N_v = O \therefore P_v = O$
$P_1 = P_2$
Efficiency $= 0.99 \cdot 0.99 \cdot 0.89 = 0.87\%$
$N_1 = 1.6\ N_2$ (i.e. at aircraft cruise speed)
$N_1 = N_2 - N_v$
$1.6\ N_2 = N_2 - N_v$
$-0.6\ N_2 = N_v$ $$0.6 = \left| \frac{-N_v}{N_2} \right|$$

$P_v = 0.6\ P_2$

For the case where all power is recirculated through a 75% efficient power conversion unit at the cruise condition:

$$P_2 = \frac{P_G}{0.89}$$

$$P_1 = \frac{1}{0.99}\left(\frac{1}{0.99} \cdot P_2 + P_v\right)$$

$$P_1 = P_i + 0.99 \cdot 0.75\ P_v$$

$$P_i = P_1 - 0.99 \cdot 0.75\ P_v$$

$$P_i = \frac{1}{0.99}\left(\frac{1}{0.99} \cdot P_2 + P_v\right) - 0.99 \cdot 0.75\ P_v$$

$$P_i = \frac{1}{0.99}\left(\frac{1}{0.99} \cdot P_2 + 0.6 \cdot P_2\right) - 0.99 \cdot 0.75 \cdot 0.6 \cdot P_2$$

$$P_i = \frac{1}{0.98} \cdot P_2 + 0.175 \cdot P_2$$

$$P_i = 1.195\ P_2$$

$$P_i = \frac{1.195}{0.89}\ PG = 1.34\ PG \text{ efficiency} = 0.75$$

If, however, nearly all of trim power, $P_2$ can be utilized via the variable frequency generator 14 then the system efficiency at this operating point is:

$$\begin{aligned} P_i &= \frac{1}{0.99} \cdot \frac{1}{0.99} \cdot P_2 + \frac{1}{0.99} \cdot P_v \\ &= 1.02\ P_2 + 1.01\ P_v \\ &= 1.02\ P_2 + 1.01\ P_v \end{aligned}$$

-continued $$P_i = 1.626\,P_2 \text{ (since } P_v = 0.6\,P_2)$$

$$= \frac{1.626}{0.89}\,P_G$$

$$P_i = 1.827\,P_G$$

$$\therefore \text{Efficiency} = \frac{1.6\,P_G}{1.827\,P_G} = 0.876$$

To allow the system to operate near to this optimum manner under steady state conditions, the control 60 operates the switches 54*a*–54*c* to apply frequency insensitive loads to the power summing node 32 so that the power which must be recirculated back to the prime mover shaft 26 is minimized. Under conditions other than steady state, electrical loads must be transferred between the fixed frequency generator 12 and the generator 14. Typically, this load switching must be done in discrete steps, and hence the power conversion unit 37 must be operated to control the speed of the differential output shaft 18. One example of such a situation is where the prime mover 28 output shaft 26 is accelerating, in turn requiring loads to be transferred from the fixed frequency generator 12 to the variable frequency generator 14.

As should be evident, loads which are frequency insensitive can be connected to the constant frequency load buses 52*a*–52*c* or to the variable frequency load buses 56*a*–56*c*. Loads of this type include heaters, rectifiers, lighting circuits and the like. The controllable switches 54*a*–54*c* which connect the variable frequency loads to the output of the fixed frequency generator 12 or the variable frequency generator 14 are controlled as a function of prime mover speed, fixed frequency loads and/or conditions encountered during operation. The control for operating the switches 54*a*–54*c* and the contactors 50*a*–50*c* may be implemented in software as a part of a control unit which controls the generators and distribution network of the aircraft electric power generating systems or the control may be dedicated solely to the task of switching the loads, as desired.

The transfer of loads would occur whenever prime mover 28 speed reaches a level such that the variable frequency generator 14 could assume load. The decision to transfer a load could be inhibited if the control 60 senses that the variable frequency generator 14 was not functional, that a load bus is faulted, (i.e. shorted to ground or to another potential) or if, for example, aircraft flight conditions were inappropriate for the transfer.

As noted above, preferably, although not necessarily, the prime mover 28 develops an output speed $N_i$ which, under usual operating conditions, is greater than the speed $N_2$, i.e. the constant output speed. Thus, the prime mover operates at speeds greater than "straight-through", i.e. greater than the speed $N_2$. In this case, the speed compensation link 30 performs a trimming function making up for any difference between the load applied to the variable frequency generator 14 and the required power draw at the second output shaft 24.

If the prime mover shaft 26 is rotating at a speed greater than the desired output speed $N_2$, power is drawn from the differential 20 and is delivered by the shaft 24 and the gear box $R_B$ to the variable frequency generator 14. The generator 14 converts the mechanical power into electrical power. If the magnitude of this power is at a usable level, as much power as possible is transferred to frequency insensitive electrical loads by the control 60. Any power which is unused by system loads is fed back to the prime mover shaft through the power electronic conversion unit 37, the permanent magnet machine PMM and the gear box $R_A$.

Alternatively, if the prime mover 28 is operating at a speed less than the desired output speed $N_2$, power must be transferred through the gear box $R_A$ to the permanent magnet machine PMM, where the mechanical power is converted to AC electrical power. The AC power is then rectified in the AC/DC converter 38, stepped up in magnitude by the DC/DC converter 40 and converted back to AC power by the AC/DC converter 39. The converter 39 is operated to provide AC power of voltage magnitude, frequency and phase suitable to drive the variable frequency generator 14 as a motor. In this manner, electrical power is converted to mechanical shaft power which is then transmitted by the second gear box $R_V$ to the summer where it is added to the power delivered to the shaft 22. In this mode of operation, no load would normally be connected to the variable frequency generator 14.

If a transient causes the direction of trim power flow to change before electrical loads are transferred, the power electronic conversion unit 37 can supply frequency insensitive loads while operating the variable frequency generator as a motor to maintain the output speed $N_2$ at the desired speed, if necessary.

It should be noted that the power converters 38–40 are bidirectional devices. A complete description of the operation of these circuits is contained in U.S. Pat. No. 4,695,776, referred to above.

In the event that the speed compensation link includes the hydraulic conversion unit illustrated in FIG. 3, the pump 42 and motor 44 may be operated by a control which is disclosed in Baits U.S. Pat. No. 4,679,462, assigned to assignee of the instant application and the disclosure of which is hereby incorporated by reference herein. Again, frequency insensitive loads are applied to the variable frequency generator 14 only when significant power must be drawn from the differential 20 to maintain the output speed $N_2$ at the desired speed.

The power system of the present invention is particularly adapted for use in aircraft, although it could be used in other applications as well. In an aircraft application, the number and type of loads and the normal operating speed of the prime mover 28 are fairly well-known in advance, and thus the system may be designed so that little or no power flows through the power converter 36 under a usual or expected operating condition. For aircraft, the expected or usual operating condition is at prime mover cruise speed with a predetermined magnitude of load on the variable frequency generator 14.

As a practical matter, it may prove difficult to insure that the power flowing through the power converter 36 is equal to zero under the expected operating condition. In fact, it may prove advantageous for control purposes to design the system such that this power is at a small, non-zero value at such point.

The generators 12, 14 may be of the wound-field type or may be permanent magnet machines. In the former case, appropriate DC excitation is provided to the fixed frequency generator 12 so that the output voltage thereof may be regulated as a function of load. In the case of the variable frequency generator 14, DC excitation may be provided or the exciter of the generator 14 may be provided AC excitation at a frequency determined by the speed of the shaft 24 such that the output frequency of the generator 14 is maintained at a constant value. This would allow the variable frequency generator 14 to supply power to loads at the same frequency as the generator 12 or to supply power to loads at a different constant frequency.

As a further alternative, AC loads might also receive power from the variable frequency generator by utilizing an inverter connected to one or both of the rectifier/regulator circuits 58a, 58b to in turn convert the DC power into constant frequency AC power.

If one or both of the generators 12, 14 is of the permanent magnet type, voltage control or the output of such generator must be undertaken by a power converter.

Figure 4:
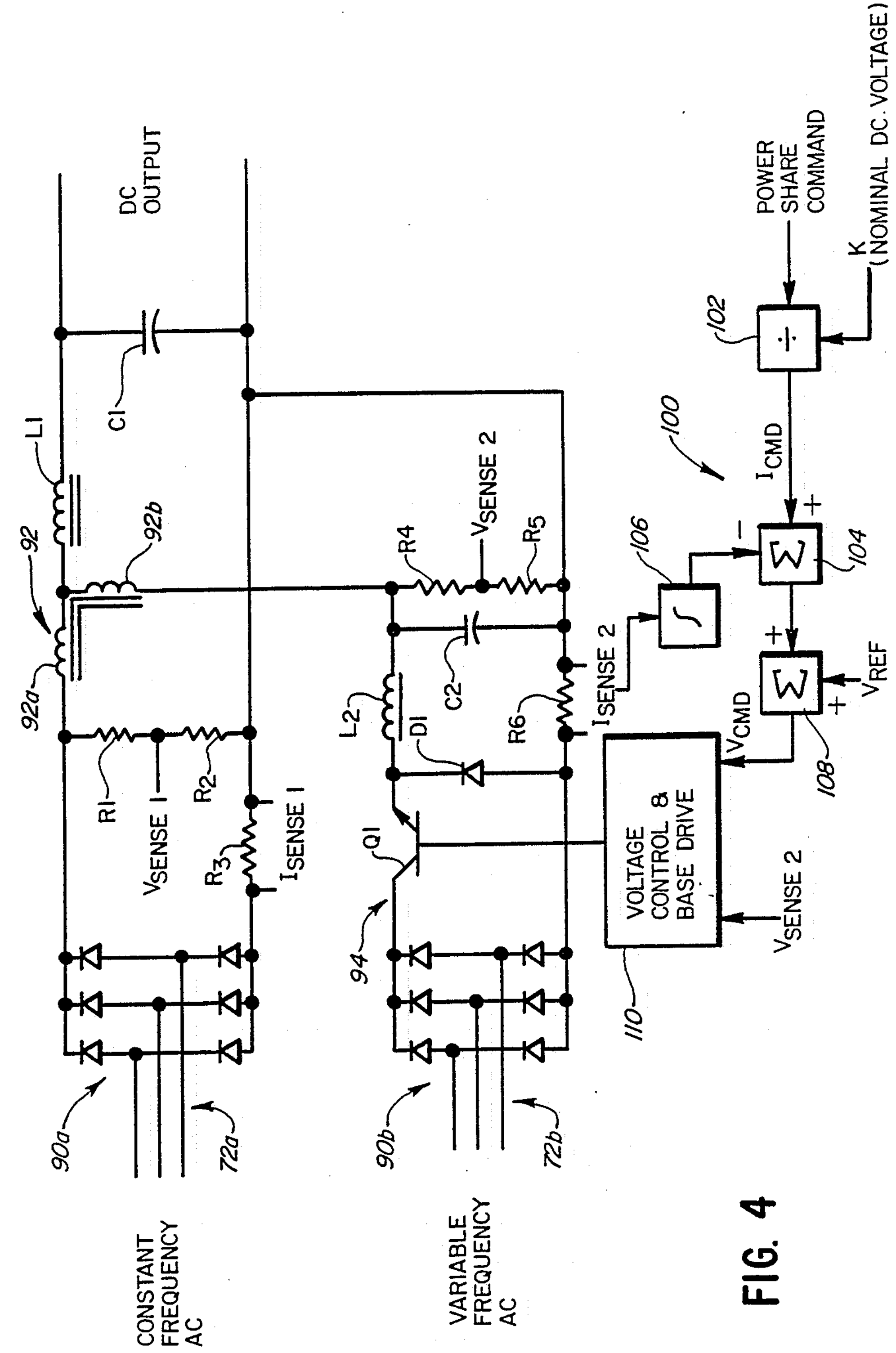
FIG. 4 is a combined schematic and block diagram of one of the rectifier/regulators shown in FIG. 1.

Referring now to FIG. 4, each rectifier/regulator circuit 58a, 58b may include first and second three-phase bridge rectifier circuits 90a, 90b coupled to the buses 72a, 72b, respectively. The rectifier circuit 90a develops DC power which is applied across resistors R1–R3. A voltage $V_{SENSE1}$ is obtained at the junction of the resistors R1 and R2 and represents the DC voltage developed by the rectifier circuit 90a while a voltage $I_{SENSE1}$ representing the current provided by the rectifiers circuit 90a is developed across the resistor R3. The voltages $V_{SENSE1}$ and $I_{SENSE1}$ may be utilized for protective or test functions or may be used as feedback for a power control module described in greater detail hereinafter.

An interphase transformer 92 including magnetically linked inductors 92a and 92b is connected to the output of the rectifier circuit 90a. The interphase transformer 92 is in turn coupled to an output filter comprising an inductor L1 and a capacitor C1 across which the DC output is developed.

The output of the rectifier circuit 90b is coupled by a conventional buck regulator 94 to the inductor 92b of the interphase transformer 92. The buck regulator includes a controllable switch Q1, a diode D1, an inductor L2 and a capacitor C2. Resistors R4–R6 are connected to the buck regulator 94 to in turn provide signals $V_{SENSE2}$ and $I_{SENSE2}$ representing the voltage and current delivered by the buck regulator 94, respectively.

The switch Q1 is operated by control circuitry 100 which is responsive to the power share command signal developed by the control 60. The power share command signal indicates the desired amount of power to be drawn from the variable frequency generator. The signal is provided to a divider 102 which divides the power share command signal by a signal K representing the nominal DC voltage to be developed by the rectifier/regulator 58. The resulting signal, designated $I_{CMD}$, is passed to a second summer 104 which in turn subtracts therefrom the integrated current developed by the buck regulator 94, as detected by an integrator 106. The resulting difference signal is passed to a third summer 108 which sums same with a reference signal $V_{REF}$ representing the desired DC output voltage and the resulting signal, designated $V_{CMD}$, representing the commanded voltage output of the buck regulator is provided to a voltage control and base drive circuit 110. The circuit 110 is also responsive to the output voltage $V_{SENSE2}$ and may comprise, for example, a pulse width modulated (PWM) generator which operates a switch Q1 in a PWM mode of operation to in turn control the output voltage and current therefrom.

Figure 5:
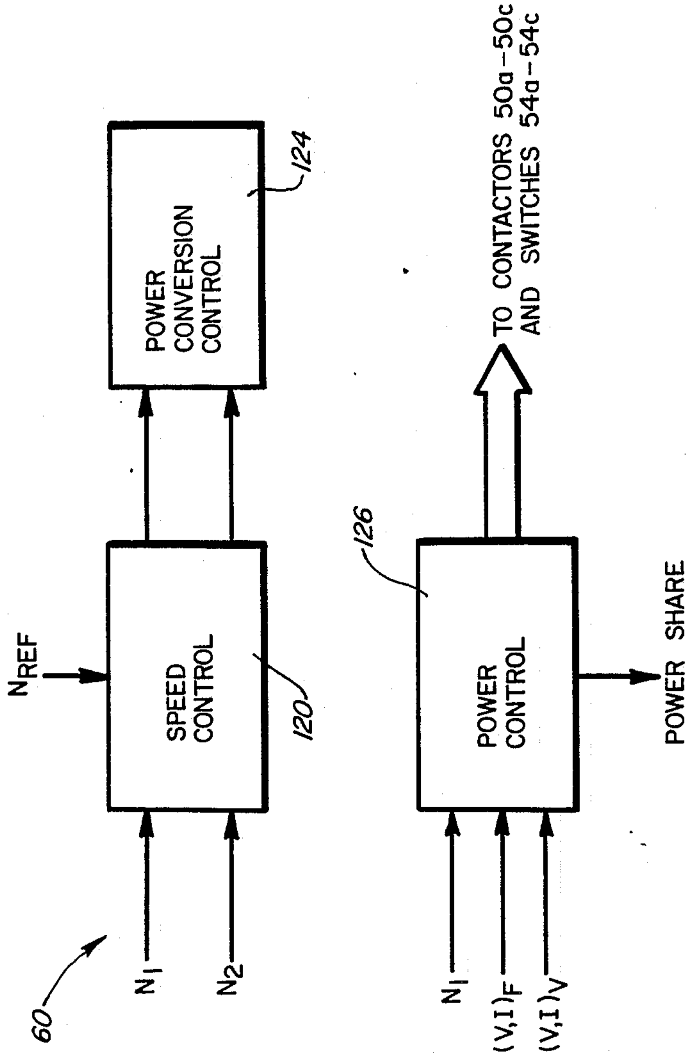
FIG. 5 is a block diagram of a portion of the control 60 illustrated in FIG. 1.

Referring now to FIG. 5, there is illustrated in block diagram form a portion of the control 60. It should be noted that the control 60 may be implemented in software and would typically include programs for effecting functions other than those shown in FIG. 5. These additional functions, such as generator voltage regulation, protection algorithms, breaker control and management algorithms and built-in test features are not a part of the present invention and hence will not be disclosed herein.

As seen in FIG. 5, the control 60 includes a speed control module 120, a power conversion control module 124 and a power control module 126. The speed control module 120 and the power conversion control module 124 maintain the the speed of the fixed frequency generator 12. These modules are functionally equivalent to the circuitry shown in the above-referenced U.S. Pat. No. 4,695,776.

The power control module 126 is responsive to the speed $N_I$, as detected by a speed sensor 128 and the sensed power parameters described above in connection with FIG. 1. The power control 126 in turn controls the contactors 50a–50c and the switches 54a14 54c and develops the power share signal described above.

Figure 6:
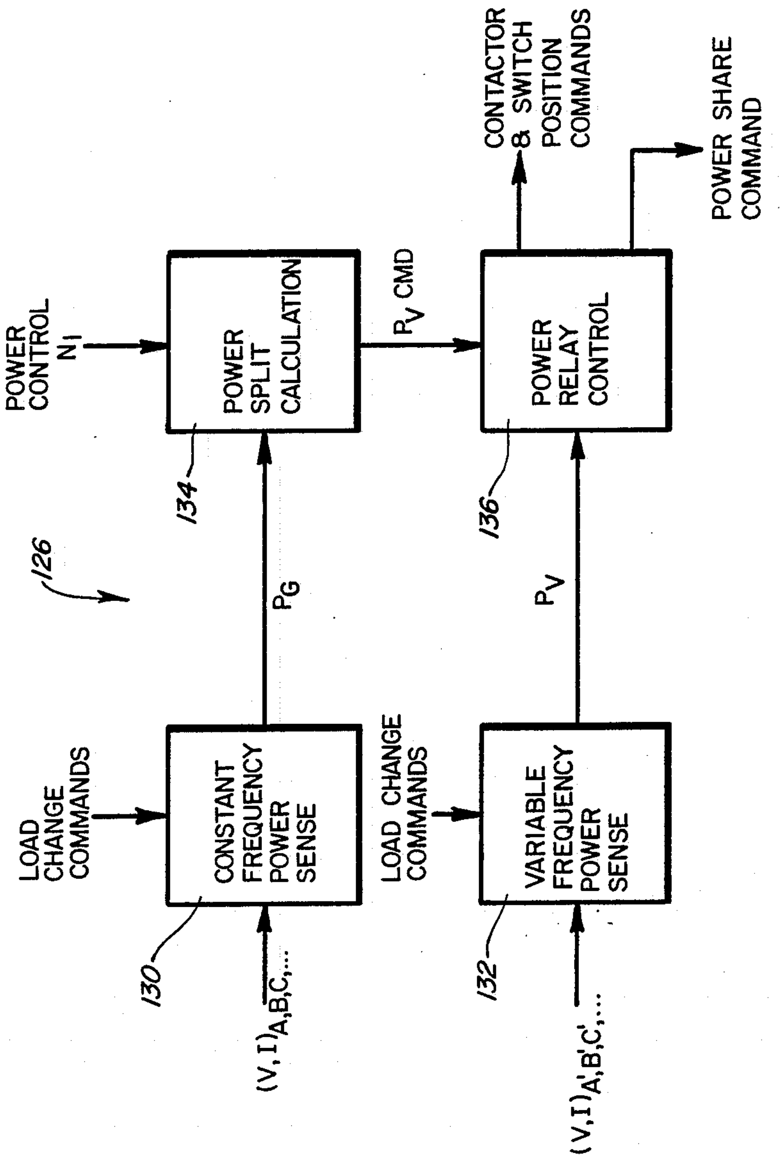
FIG. 6 is a block diagram of the power control module 126 of FIG. 5.

FIG. 6 illustrates in greater detail the power control module 126. Two power sense modules 130 and 132 combine the voltage and current on each load bus 66a, 66b, 66c and 56a, 56b and 56c, respectively to determine the power carried thereby as well as the total variable frequency and constant frequency loads. The calculated bus powers are modified by load change commands from external control and protection modules which do not form a part of the present invention. These load change commands allow the system to react quickly to changes in applied load.

The input shaft speed $N_I$ and the total constant frequency generator power $P_G$ are used to determine the desired amount of power to be drawn from the variable frequency generator 14. The power split calculation module 134 develops a signal $P_{VCMD}$ representing the amount of power to be drawn from the variable frequency generator 14 and provides same to a power relay control module 136. The control module 136 is further responsive to the sensed variable frequency bus load powers determined by the module 132 and controls the contactors 50a–50c and the switches 54a–54c in accordance therewith. The power relay control module 136 also develops the power share command signal described above.

Figure 7:
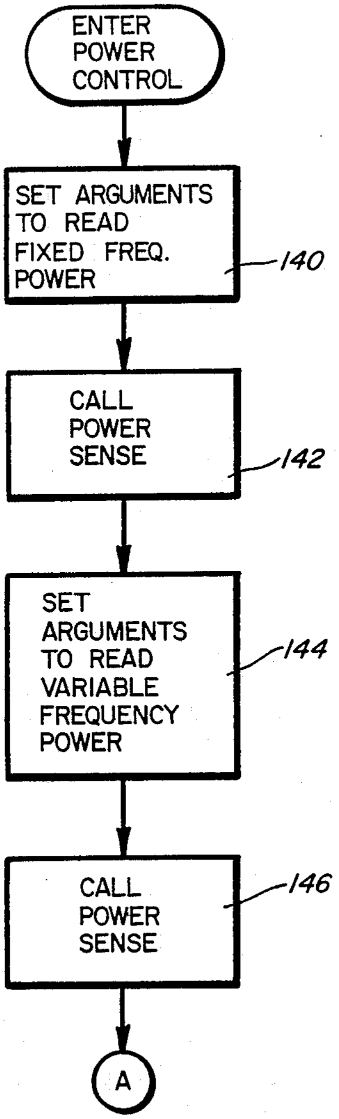
FIG. 7 is a flowchart illustrating programming for implementing the power sensing modules 130 and 132 of FIG. 6.

The power control module 126 is called periodically by controller supervisory software or by hardware interrupt. FIG. 7 illustrates programming to implement the power sense modules 130 and 132. Upon entry to the module 130, a block 140 sets arguments which point to the sensor inputs and the computer memory tables where the data for the constant frequency load buses are available. A block 142 then calls a power sense subroutine, described in greater detail in connection in FIG. 8, which calculates the power on each constant frequency bus 66a–66c.

Following the block 142, a block 144 resets the arguments to point to the sensor inputs and computer memory tables where the data for the variable frequency load buses are available. A block 146 then calls the power sense subroutine, FIG. 8.

Figure 9:
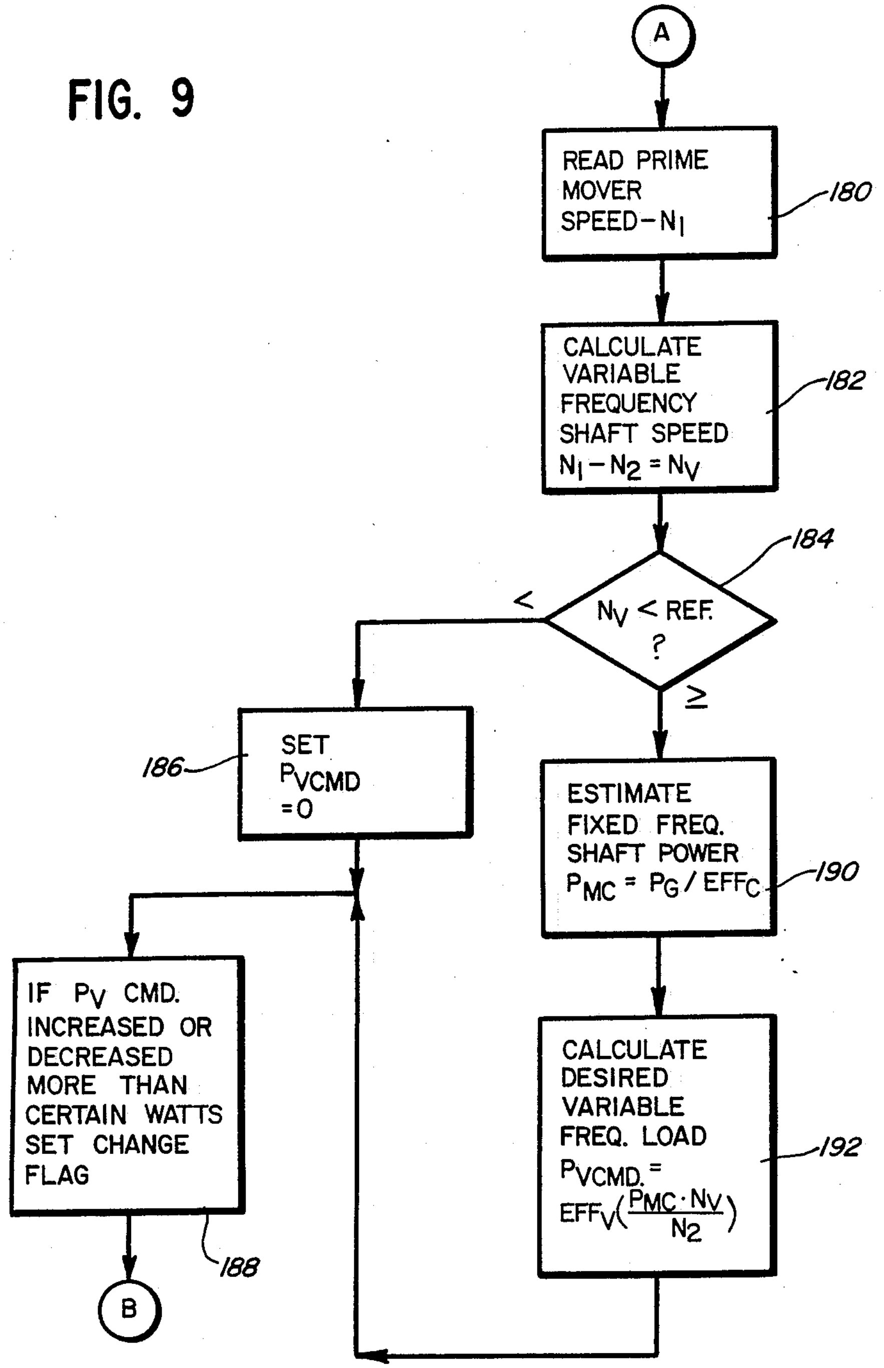
FIG. 9 is a flowchart illustrating programming for implementing the power split calculation module 134 of FIG. 6.

Following the block 146, control passes to the power split calculation module 134 which is shown in flowchart form in FIG. 9.

Figure 8:
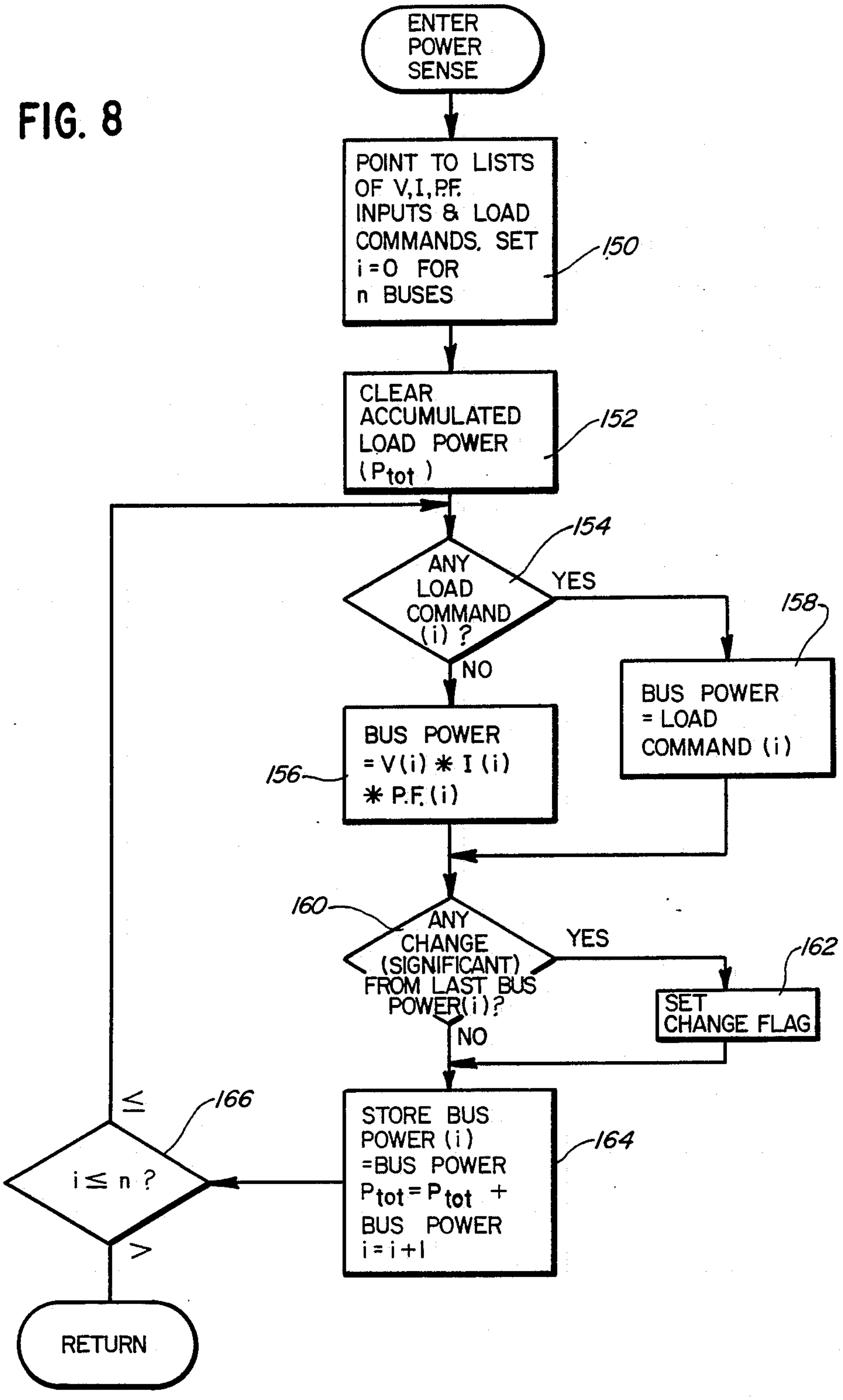
FIG. 8; is a flowchart illustrating a power sense subroutine called by the blocks 142 and 146 in FIG. 7.

Referring now to FIG. 8, the power sense subroutine begins at a block 150 which uses the data contained in the arguments to its subroutine calls to point to input addresses where the voltages, currents, power factors and load command information are contained for each individual load bus as well as to point to the memory addresses where the individual bus powers and the total power for the set of load buses are stored after they have been calculated. In addition, the block 150 sets a loop counter i equal to 0. Following the block 150, a block 152 clears a variable $P_{tot}$ which represents the accumulated load power calculated by the remainder of the programming of FIG. 8.

A block 154 then checks to determine whether there is a load command for the particular bus represented by the loop counter i. If there is no load command, a block 156 calculates the bus power by multiplying the bus voltage by the bus current and the bus power factor. On the other hand, if there is a load command for the bus, a block 158 sets the bus power equal to the load command for the bus.

The bus load command is a value supplied by external logic which predicts what the bus load will become momentarily as loads are applied or removed for operational or protective reasons. By setting the bus power equal to the load command, transient effects caused by the transfer of loads to and from the buses are minimized.

Control from each of the blocks 156 and 158 passes to a block 160 which checks to determine whether there is any significant change from the last calculated power for the bus represented by the loop counter i. If there has been a significant change in the bus power, a block 162 sets a change flag. Otherwise, control passes directly to a block 164 which stores the bus power together with an indication of the identity of the particular bus. The block 164 also updates the variable $P_{tot}$ by adding to the old value of such variable the bus power calculated by the blocks 156 or 158, and increments the loop counter i. Control then passes to a block 166.

The block 166 checks to determine whether all of the bus powers have been calculated. If this is not the case, control returns to the block 154. On the other hand, if all of the bus powers have been calculated, control returns to the appropriate point in the flowchart of FIG. 7.

It should be noted that the power sense subroutine of FIG. 8 would also be executed for the loads applied to the outputs of the rectifier/regulator circuits **58*a* and 58*b***, if such loads are present.

Referring now to FIG. 9, there is illustrated in detail the programming for implementing the power split calculation module 134. The power which may be drawn from the variable frequency generator 14 is a function of the prime mover shaft speed $N_I$ and the power applied to the fixed frequency generator 12. The power split calculation module 134 determines the desired variable frequency power by determining the required variable frequency shaft speed. Thus, a block 180 detects the prime mover speed $N_I$ and a block 182 calculates the variable frequency shaft speed which is equal to the prime mover speed $N_I$ minus the desired output speed $N_2$.

Following the block 182, a block 184 checks to determine whether the variable frequency shaft speed $N_V$ is less than a reference speed REF. If so, then it has been determined that the speed of the generator 14 is insufficient to supply power to variable frequency loads. Thus, the variable $P_{VCMD}$ is set equal to zero by a block 186 and control passes to a block 188 which sets a change flag if the value $P_{VCMD}$ has increased or decreased more than a certain amount since it was last determined.

Figure 10A:
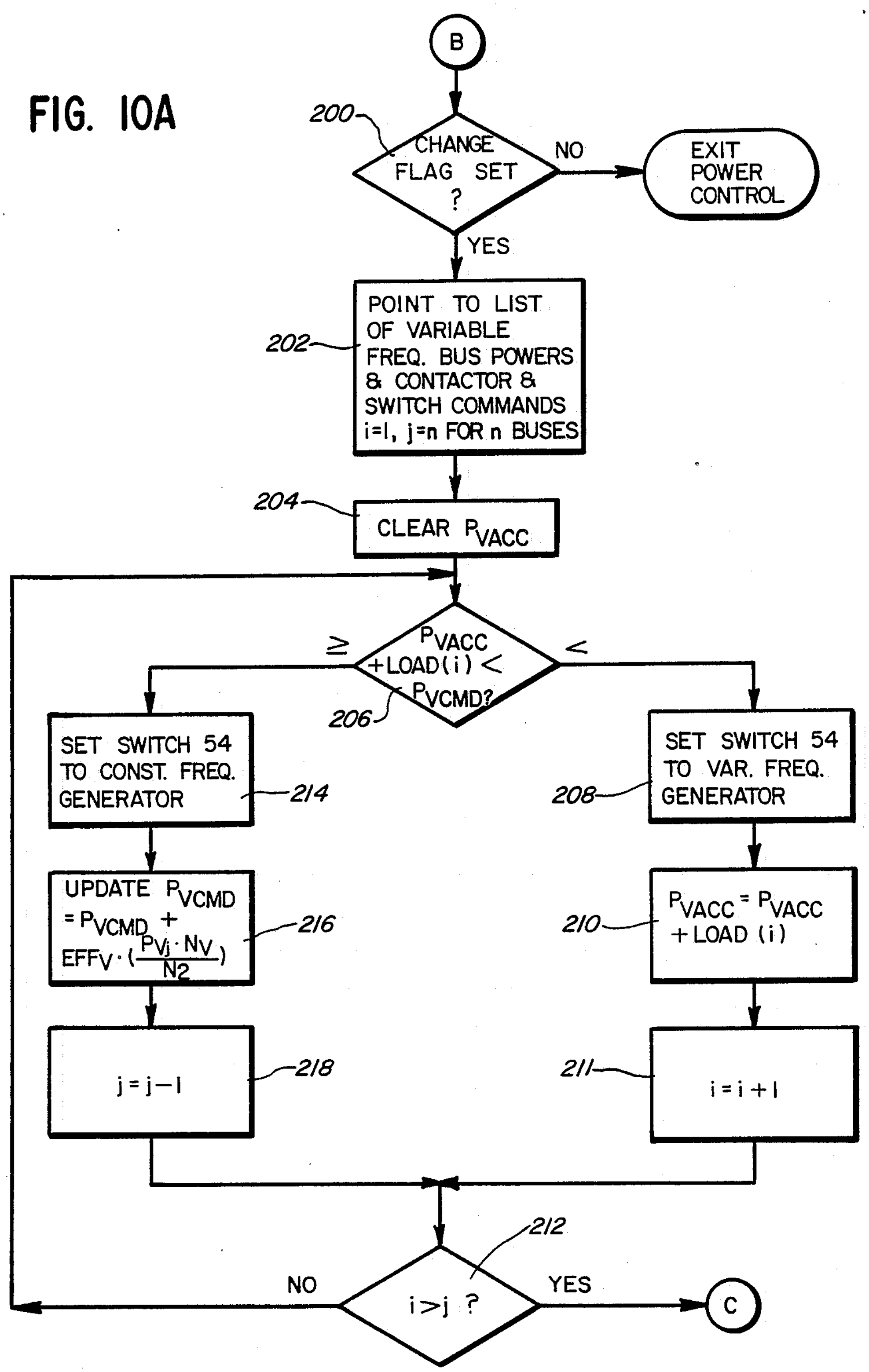
FIGS. 10*a* and 10*b*, when joined along the similarly lettered lines, together comprise a flowchart illustrating programming for implementing the power relay control module 136 of FIG. 6.

Following the block 188, control passes to the power relay control illustrated in FIG. 10A.

If the block 184 determines that the speed of the variable frequency generator 14 is sufficient to supply power to variable frequency loads, a block 190 estimates the power $P_3$ of the fixed frequency generator 12 by dividing the constant frequency electrical load by a value representing the efficiency of the fixed frequency generator 12. The resulting value $P_{MC}$ is used by a block 192 to calculate the desired variable frequency load according the following equation:

$$P_{VCMD}=EFF_V\times P_{MC}\times N_V/N2$$

where $EFF_V$ is the estimated efficiency of the variable frequency generator 14.

Following the block 192, control passes to the block 188 described above.

FIG. 1OA and 10B illustrate the power relay control module 136. A block 200 checks to determine whether the change flag has been set. If this is not the case, control exits from the power control module 126. On the other hand, if the change flag has been set by the block 162, FIG. 8, or the block 188, FIG. 9, control passes to a block 202 which sets pointers to the list of calculated load powers in the corresponding list of contactor and switch control outputs. The block 202 sets a loop counter i = 1 and a variable j = n where n is the number of buses which, in this case is equal to six. A block 204 then clears a variable $P_{VACC}$ representing the accumulated variable frequency load powers.

Following the block 204 a block 206 checks to determine whether the value $P_{VACC}$ plus the bus power represented by the loop counter i is less than the value $P_{VCMD}$. If so, then that bus can be connected to the variable frequency generator 14 and hence control passes to a block 208 which sets the proper switch 54 for the particular bus 56 to connect such bus to the power summing node 32. A block 210 then updates the value $P_{VACC}$ by adding to it the calculated power on such bus and a block 212 increments the loop counter i. A block 214 then checks to determine whether the loop counter i is greater than the variable j. If not, control returns to the block 206.

If the block 206 determines that the value $P_{VACC}$ plus the bus power is greater than or equal to the value $P_{VCMD}$, then it has been determined that the generator 14 cannot supply sufficient power to such bus as well as any other buses already connected thereto. Thus, a block 214 operates the proper switch 54 to connect the respective variable frequency bus 56 to the output of the fixed frequency generator 12. A block 216 then updates the value $P_{VCMD}$ using a value $P_{VJ}$ which is the power of the load bus which has just been connected by the block 214 to the output of the fixed frequency generator 12.

Following the block 216, a block 218 decrements the value j by one and control passes to the block 212.

Summarizing the operation of the flowchart of FIG. 10A, pointers are set to the list of calculated load powers and the corresponding list of relay control outputs. A variable frequency load power accumulator $P_{VACC}$ is cleared and a loop is then executed where the load on the next bus on the list is added to the accumulated load. The resulting value is then compared with a commanded value $P_{VCMD}$. If the commanded value is not exceeded, the switch 54 associated with the current (i th) bus under consideration is set to connect such bus to the variable frequency generator 14. If, on the other hand, the value $P_{VCMD}$ is exceeded, the switch 54 associated with the last (i.e. j th) load bus is connected to the fixed frequency generator 12. This, in turn, increases the fixed frequency load to in turn allow the variable frequency load command to be increased.

The foregoing process repeats until all of the load buses have been checked.

If any protection or operational oriented switch commands are present, they are applied to override the calculated switch and contactor settings.

The power relay control settings will not be changed if the commanded variable frequency power or the amount of variable frequency load does not change by more than a specified amount. A decrease in the value $P_{VCMD}$ will result in an immediate change. This eliminates the possibility of "chattering" switches and contactors caused by slight load changes while avoiding operating in a mode where more variable frequency power is demanded then is available.

Figure 10B:
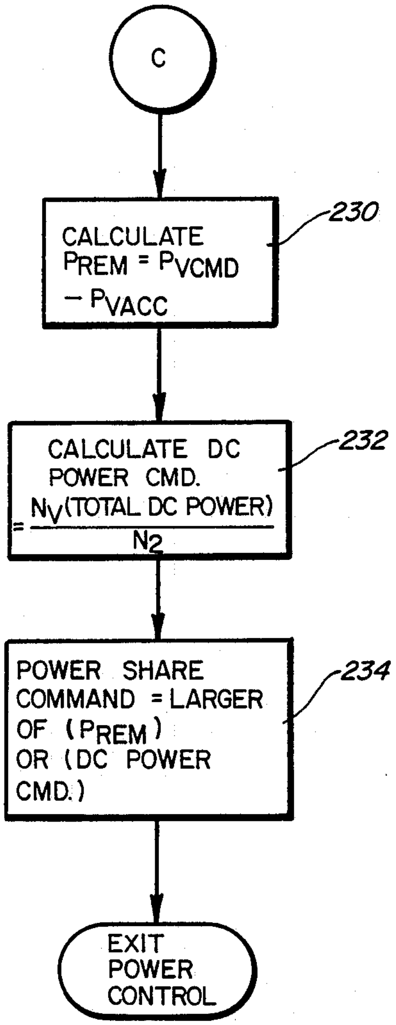

The flowchart of FIG. 10B, which is executed following the block 212, FIG. 10A, is an optional part of the power relay control 136 and is utilized in the event that the rectifier/regulators **58*a* and 58*b* are utilized and if such circuits have the ability to draw a specific proportion of power from either of the fixed frequency or variable frequency generators 12, 14. The programming illustrated by the flowchart of FIG. 10B generates the power share command which is equal to the difference between the variable frequency loads connected to the variable frequency generator 14 and the commanded (i.e. desired) amount of variable frequency load represented by the value $P_{VCMD}$. Following the block 212, a block 230 calculates a value $P_{REM}$ which is equal to $P_{VCMD} - P_{VACC}$. A block 232 then calculates a commanded DC power equal to $N_V$ times the total DC power divided by the speed $N_2$. The DC power command and the value $P_{REM}$ are compared and the larger of the two is utilized as the power share command by a block 234. Control then exits the power control module 126**.

The optional software of FIG. 10B can be utilized to overcome the discrete switching of loads between the fixed and variable frequency generators 12, 14 so that power flow through the power electronic conversion unit 37 is held to zero or any other desired value. This would also tend to smooth transients caused by load application and removal since the active regulation provided by the rectifier/regulators **58*a*, 58*c*** would have a relatively fast response.

I claim:

1. A hybrid power system for providing electric power to first and second loads, comprising:

a constant speed drive having an input coupled to a prime mover which develops variable-speed motive power, an output driven at a substantially constant speed and a speed compensation link which transmits motive trim power at a magnitude determined by the speed of the prime mover;

a first generator coupled to the output of the constant speed drive; and a second generator coupled to the speed compensation link and driven by the motive trim power wherein the first generator develops constant frequency electric power for the first load and the second generator develops electric power for the second load at a frequency which varies in accordance with the magnitude of the trim power wherein the second load is outside of the speed compensation link.

2. The hybrid power system of claim 1, wherein the second generator is coupled to a power summing node of the speed compensation link and supplies at least a certain power magnitude to a load and a bidirectional power converter is coupled within the speed compensation link between the power summing node and the prime mover and wherein power flows through the power converter from the power summing node to the prime mover when the motive trim power magnitude is greater than that required to cause the second generator to supply the certain power magnitude to the load and wherein power flows through the power converter from the prime mover to the power summing node when the motive trim power magnitude is less than that required to cause the second generator to supply the certain power magnitude to the load.

3. The hybrid power system of claim 1, wherein the second generator is coupled to a power summing node of the speed compensation link and supplies power to a load and a unidirectional power converter is coupled within the speed compensation link between the power summing node and the prime mover and wherein power flows through the power converter from the power summing node to the prime mover when the motive trim power magnitude is greater than a certain magnitude and wherein substantially no power flows through the power converter when the motive trim power magnitude is less than the certain power magnitude.

4. The hybrid power system of claim 3, wherein the load is of variable magnitude and further including means for sensing a parameter of the power supplied by the second generator and means responsive to the sensing means for varying the magnitude of the load on the second generator in dependence upon the sensed parameter.

5. A hybrid power system comprising:

a constant speed drive having an input coupled to a prime mover which develops variable-speed motive power, an output driven at a substantially constant speed and a speed compensation link which transmits motive trim power at a magnitude determined by the speed of the prime mover;

a first generator coupled to the output of the constant speed drive;

a second generator coupled to the speed compensation link and driven by the motive trim power wherein the first generator develops constant frequency power and the second generator develops output power at a frequency which varies in accordance with the magnitude of the trim power, wherein the second generator is coupled to a power summing node of the speed compensation link; and a control which selectively connects frequency insensitive loads to the first or second generator in dependence upon the magnitude of the motive trim power.

6. The hybrid power system of claim 5, wherein the constant speed drive develops a magnitude of motive output power which is converted by the first generator into electrical output power at a certain magnitude and wherein the control includes means for sensing the speed of the prime mover, means for estimating the magnitude of the motive output power from the magnitude of the electrical output power and means for calculating a desired magnitude of second generator output power from the sensed prime mover speed and the estimated magnitude of the motive output power.

7. The hybrid power system of claim 6, wherein the frequency insensitive loads are connected to buses and wherein the control further includes means for determining the power on each of the buses and a power relay control which is responsive to the calculating means and the determining means which selects which buses are connected to the second generator whereby the sum of the powers on the buses connected thereto does not exceed the desired magnitude of second generator output power.

8. The hybrid power system of claim 5, wherein the constant speed drive includes a differential speed summer having a first shaft coupled to the prime mover, a second shaft and an output shaft coupled to the first generator, a permanent magnet machine (PMM) coupled to the prime mover and a power conversion unit coupled between the PMM and the power summing node and wherein the second generator includes a motive power shaft coupled to the differential speed summer second shaft and electrical power windings coupled to the power summing node.

9. The hybrid power system of claim 5, wherein the constant speed drive includes a differential speed summer having a first shaft coupled to the prime mover, a second shaft and an output shaft coupled to the first generator, a hydraulic pump coupled to the prime mover and a hydraulic motor coupled between the pump and the power summing node and wherein the second generator includes a motive power shaft coupled to the power summing node and electrical power windings at which the output power is produced.

10. A hybrid power system, comprising:

a constant speed drive having an input coupled to a prime mover which develops variable-speed motive power, an output driven at a substantially constant speed and a speed compensation link which transmits motive trim power at a magnitude determined by the speed of the prime mover;

a first generator coupled to the output of the constant speed drive;

a second generator coupled to the speed compensation link and driven by the motive trim power wherein the first generator develops constant frequency power and the second generator develops output power at a frequency which varies in accordance with the magnitude of the trim power, wherein a controlled regulator/rectifier is connectable to either the first or second generator;

means for developing a power share command representing the desired power magnitude to be drawn from the second generator;

means for connecting the regulator/rectifier to the second generator when such generator is developing sufficient power to supply the regulator/rectifier; and means for operating the regulator/rectifier in accordance with the power share command such that the desired power magnitude is drawn from the second generator.

* * * * *